United States Patent [19]
Javitt et al.

[11] Patent Number: 5,805,585
[45] Date of Patent: Sep. 8, 1998

[54] METHOD FOR PROVIDING HIGH SPEED PACKET DATA SERVICES FOR A WIRELESS SYSTEM

[75] Inventors: Joel I. Javitt, Hillside; Edward Wronka, Basking Ridge, both of N.J.

[73] Assignee: AT&T Corp., Middletown, N.J.

[21] Appl. No.: 701,617

[22] Filed: Aug. 22, 1996

[51] Int. Cl.⁶ .......................... H04B 7/216; H04B 15/00
[52] U.S. Cl. .................. 370/342; 370/335; 370/320; 375/200; 375/202; 375/206
[58] Field of Search ................... 370/335, 320, 370/342, 470, 472; 375/200, 202, 208, 206, 347; 455/69, 522

[56] References Cited

U.S. PATENT DOCUMENTS

| | | | |
|---|---|---|---|
| 5,535,239 | 7/1996 | Padovani et al. | 375/200 |
| 5,550,811 | 8/1996 | Kaky et al. | 370/342 |
| 5,559,789 | 9/1996 | Nakano et al. | 375/200 |
| 5,594,754 | 1/1997 | Dohi et al. | 375/200 |
| 5,604,766 | 2/1997 | Dohi et al. | 375/200 |
| 5,619,524 | 4/1997 | Ling et al. | 375/200 |
| 5,623,485 | 4/1997 | Bi | 370/342 |

Primary Examiner—Chi H. Pham
Assistant Examiner—Steven Nguyen
Attorney, Agent, or Firm—Alfred G. Steinmetz

[57] ABSTRACT

A low cost solution for providing wireless multi-rate packet data communications between a transmitting unit and a receiving unit on a single spread spectrum channel. The transmitting unit and receiving unit are operable to change communications modes at any given time to provide packet data communications at any given data rate for any given duration. In general, the transmitting unit is operable to change the coding gain of the transmitted spread spectrum to establish a communications mode providing a given data rate for communication to the receiving unit. In one embodiment, the transmitting unit first establishes a regular communications mode, wherein the transmitting unit generates a spread spectrum packet data signal having a high coding gain, thus providing low rate, highly reliable communications over the channel. Then, at any given time, the transmitting unit sends an escape sequence instructing the receiver to switch to a temporary communications mode, wherein the transmitting unit generates a signal having a lower coding gain, and thus provide a higher data rate for such user services requiring high rate communications.

37 Claims, 2 Drawing Sheets

METHOD FOR PROVIDING HIGH SPEED PACKET DATA SERVICES FOR A WIRELESS SYSTEM

FIELD OF THE INVENTION

This invention relates to wireless communications systems, and more particularly to wireless packet data communications systems.

BACKGROUND OF THE INVENTION

Although communication systems take many forms, the general purpose of a communication system is to transmit information from a source to a destination located some distance away. As a result, communication systems basically consist of a transmitter, a channel and a receiver. The function of the transmitter is to process some original message (i.e. information to be communicated) into a form suitable for transmission over the channel. The channel, in turn, provides a physical connection between the transmitter and the receiver so that the message can be communicated therebetween. The receiver, therefore, has the function of processing the received signal and reproduce the original message.

Before transmitting the original message, however, the transmitter must manipulate the original message into a form suitable for transmission over the channel. The process of manipulating the original message into a transmission signal is called modulation. In general, modulation involves varying some parameter of a carrier wave with the message signal in such a way that the spectrum of the modulated wave matches the bandwidth of the channel over which the message is communicated. Once modulated, the signal is transmitted over the channel to the receiver, which, as stated above, recreates the original signal from the modulated signal. This process is called demodulation. As a result, communications systems can be said to transmit information through a series of modulation/demodulation processes.

One type of communication system, called a spread spectrum system, utilizes a modulation technique that spreads a signal over a wide frequency band within a communications channel. As a result, the frequency band of the communication channel in a spread spectrum system is much wider than the minimum bandwidth required to transmit the original information or message. For example, a voice signal having a bandwidth of only a few kilohertz can be sent over a spread spectrum channel which has a frequency band that is many megahertz wide.

Presently, such spread spectrum modulation is accomplished by modulating a carrier signal with an original message signal and with a wideband encoding signal (called a spreading code). More specifically, the spreading code is used to expand the bandwidth of the original message so that a greater amount of information is transmitted per each piece of the original message. That is, in communicating a digital signal composed of a sequence of bits, a plurality of bits or chips of a spreading code are sent as representative bits of the original information. As a result, a plurality of spreading code chips are transmitted for each bit of the original signal such that a predetermined bit rate is established for the communications between the transmitting unit and the receiving unit.

The most common method for spreading the original message is by multiplying each bit of the original information with a sequence of bits of the spreading code to form a spread signal for transmission over the channel. Thus, as stated above, the transmitted signal carries many bits for each information bit of the original signal. This ratio of transmitted bits to original signal bits is referred to as the coding gain of the communications system. In such spread spectrum systems, it is apparent that the greater the number of bits transmitted for each bit of the original message, the higher the coding gain. And, as is well known in the art, the higher the coding gain, the lower the communication data rate between the transmitter and the receiver for a given bandwidth. Since, however, a high coding gain provides communications that are less susceptible to noise, there is a tradeoff between data rate and transmission quality (i.e. transmission errors). That is, at higher data rates the transmission quality tends to decline for a given bandwidth.

The spreading code applied by the transmitter to the original message must be known at the receiver in order to recover the original message from the transmitted spread spectrum signal. That is, in order to recover the original signal in a spread spectrum system, the receiver must apply the spreading code to the received signal synchronously with the transmitting unit. Thus, in transmitting information over spread spectrum systems, it is important to choose a coding gain that provides the desired data rate without degrading transmission quality (e.g. bit error rate) and maintaining synchronization between the transmitting unit and the receiving unit. The choice of coding gain must also be consistent with the transmitted power and the path loss; however, the use of higher transmitted power creates more noise to other users.

One major advantage of spread spectrum systems is the ability to provide multiple access capability. That is, spread spectrum systems can provide communications from one transmitting unit to many remote units over the same channel. One method of providing such multiple access spread spectrum communications is through a code division multiple access (CDMA) communications system. In a CDMA system, a unique spreading code is applied to each signal transmitted over the communications channel. That is, signals transmitted in the same frequency band of the communication channel are only separated by a spreading code. As a result, a particular signal may be retrieved from the channel only by applying its respective spreading code to the received composite signal. Further proving the importance of synchronizing the spreading code between the transmitter and the receiver.

Presently, CDMA spread spectrum communications are used in wireless communications such as cellular telephone communications. To provide high quality communications in the very noisy cellular telephone environment, however, present day CDMA wireless communication system utilize high coding gains. As a result, such present day wireless communications systems provide only low data rate channels for communicating information between a transmitting unit and a receiving unit. Although such low rate channels substantially reduce the software and hardware complexity at the terminal and network side of communications, and substantially minimizes the chance of disrupting channel synchronization and power control between units, they are not desirable for many new user services.

As a result, with the advent of more varied and customized wireless user services, system performance and efficiency can not be maintained by such present-day low data rate communications. Thus, there is a need for a wireless packet data communication system that provide high-rate packet data communications between communicating units, without sacrificing system performance and efficiency.

SUMMARY OF THE INVENTION

Accordingly, the present invention is directed to a wireless packet data communication system and method for providing multi-rate packet data communications on a single spread spectrum channel to increase communication efficiency (i.e. data rate) without sacrificing communication quality. To achieve this, the present invention provides a communication system having a transmitter and a receiver that are operable to change communications modes at any given time to provide packet data communications at any given data rate for any given duration.

In general, the transmitting unit is operable to change the coding gain of the transmitted spread spectrum signal to establish a communications mode providing any given data rate between the transmitter and the receiver. In one embodiment, the transmitter establishes a normal communications mode for transmitting a continuous data signal at a first data rate, wherein said first data rate is established by setting a first coding gain. To change the data rate, the transmitter is operable to send an escape sequence to instruct the receiver to enter a temporary communications mode for transmitting a packet data signal at a second data rate, wherein said second data rate is established by setting a second coding gain for the signal transmitted during that temporary communications mode (thus keeping signal bandwidth constant.) The receiver is operable to acquire and track the transmitted packet data signal at any given data rate, and thus any given coding gain set by the transmitter.

In another embodiment, a CDMA spread spectrum communications system has a transmitter operable to communicates packet data to a receiving unit, having a RAKE receiver, at one of two different given data rates, wherein the RAKE receiver is operable to enter into a mode for acquiring, tracking and despreading a signal transmitted in either mode. In operation, the transmitting unit and the receiving unit first establish synchronization and power optimization for a first (e.g. low rate) packet data communication, during which a high coding gain is employed to transmit the information over the channel. To inform the receiving unit to switch to the second (e.g. high rate) communication, the transmitting unit first sends an escape sequence to the receiving unit, and then simultaneously changes the transmit power to support the desired coding gain and data rate without increasing the bit error rate. The receiving unit then adjusts the coding gain synchronously with the transmitting unit and extracts data bits from the high rate data stream to reconstruct the original message. Once the data is transmitted at the higher data rate, the receiving unit and the transmitting unit simultaneously drop back into the low rate packet data communications mode.

As a result, the present invention provides both low data rate (i.e. high coding gain) and high data rate (i.e. low coding gain) communications over the same channel, and thus provides a means for maintaining communications quality in servicing the needs of the more demanding present day users. Thus, the present invention overcomes to a large extent, the limitations of the prior art. These and other features of the invention are described in more detail in the following detailed description of the embodiments of the invention when taken with the drawings. The scope of the invention, however, is limited only by the claims appended hereto.

DETAILED DESCRIPTION OF ILLUSTRATIVE EMBODIMENTS OF THE INVENTION

Figure 1:
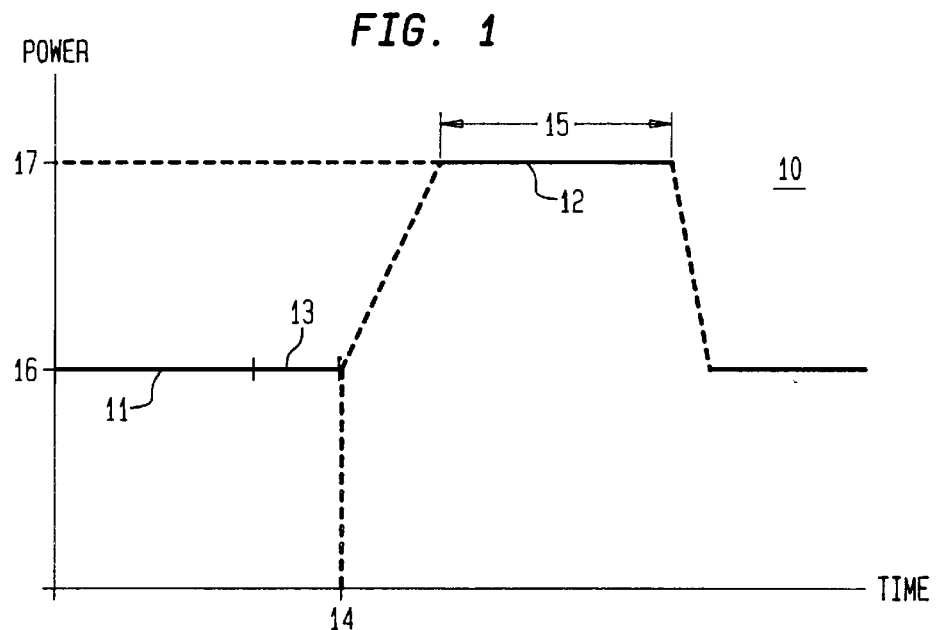
FIG. 1 shows a graph/timing diagram of one embodiment of the method for providing multi-rate packet data communication according to the present invention.

Referring now to FIG. 1, there is shown a graph/timing diagram illustrating the operation of one embodiment of a wireless communications system according to the present invention, hereinafter referred to as system 10. As shown, system 10 provides two communication modes 11 and 12, wherein each mode provides a different coding gain and thus a different data rate for communications between a transmitting unit (not shown) and a receiver (not shown).

In operation, communications on system 10 can be changed between communications modes 11 and 12 at any given time. To switch from communications mode 11 to communications mode 12, the transmitting unit (not shown) first sends and escape sequence 13 to the receiver (not shown) indicating that the switch will take place at given time 14. As a result, at given time 14, the transmitting unit (not shown) and the receiver (not shown) simultaneously switch to communications mode 12 for a given duration 15. After duration 15, the transmitting unit and receiver both switch back to original communications mode 11. This procedure can be repeated at any time, on the fly, at the control of the transmitting unit.

In one embodiment, to establish communications mode 11, the transmitting unit first firmly establishes synchronization and power control with the receiver for transmitting a signal having a given bit error rate (BER) at the given coding gain and data rate provided by communications mode 11. That is, the transmitting unit determines the minimum power level at which it should transmit the packet data at the given coding gain and data rate to achieve a given BER. This power level is shown as power level 16 in FIG. 1. Thus, once power level 16 is determined and synchronization between the transmitting unit and the receiver is established, the transmitting unit can begin communicating at the given data rate for communications mode 11.

When the transmitting unit decides or is requested to change the communication data rate for a given user service, however, the transmitting unit first transmits escape sequence 13 instructing the receiver to switch to communications mode 12 at time 14. Upon detection of escape sequence 13, both the transmitting unit and the receiver switch to communications mode 12 at time 14, wherein the coding gain is decreased by a given amount to provide a given data rate above that provided in communications mode 11, and the transmit power level is increased to level 17 to maintain a given BER at the higher data rate. Upon completion of the high rate communications in communications mode 12, for duration 15, both the transmitting unit and the receiver switch back to communications mode 11 and continue normal operation. Thus, the present invention provides a multi-rate wireless communication system for communicating spread spectrum packet data between a transmitter and a receiver over a single channel, wherein the data rate can be changed on the fly for any given duration by changing the coding gain of the coding sequence used to spread the data.

Figure 2:
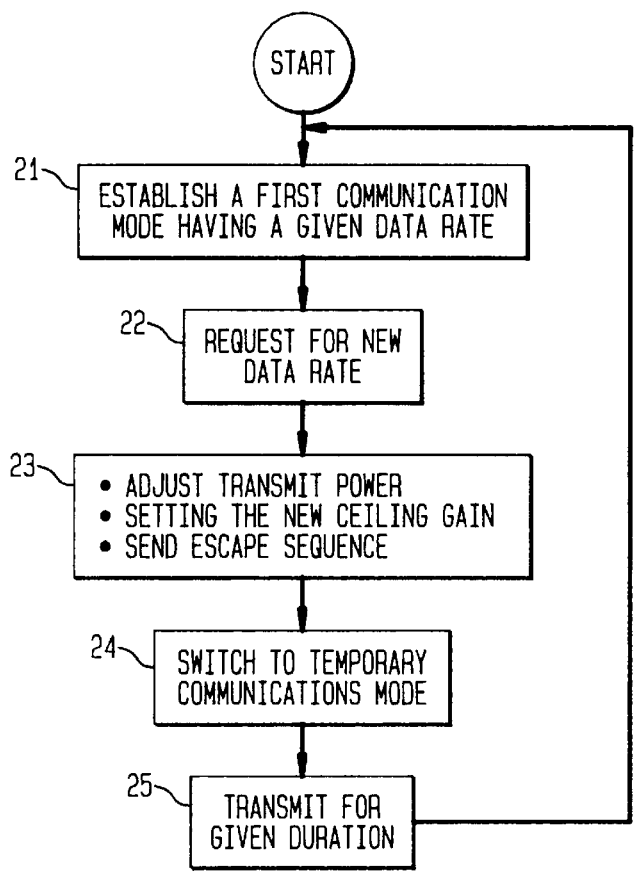
FIG. 2 shows a flow chart illustrating one embodiment of the steps for providing multi-rate packet data communication according to the present invention.

Referring now to FIG. 2, there is shown a block diagram illustrating the process performed by the transmitter of such a wireless system to provide the multi-rate communications. As shown, the transmitter first establishes the normal communications mode at step 21, wherein a low-rate data communication is established between the transmitter and the receiver. Once a request is received for a higher communications rate at step 22, the transmitter performs a series of steps to switch to a temporary communications mode at step 23. The series of steps include adjusting the transmit power so that the receiver will receive the packet data at the requested higher data rate at a desired BER, setting the communications to a coding gain so that the requested rate of communications can be provided, and sending an escape sequence to the receiver to instruct the receiver to switch to the desired coding gain and data rate. Once completed, the transmitter enters the temporary communications mode at step 24, wherein the packet data is transmitted at the new high data rate for a given duration at step 25. Once completed, communications between the transmitter and receiver return to the normal mode established above.

In one embodiment, the duration of the temporary communications mode as described above, can be established by the transmitter through the escape sequence transmitted to the receiver prior to switching to the temporary mode, or alternatively, after the escape sequence is sent to the receiver, the temporary communications mode can continue until the transmitter sends a second escape sequence requesting a return to the normal mode of operation. Alternatively, the duration of the temporary communications mode made be preset to a period less than the channel coherence interval. In this case the receiver need not update synchronization or other adaptive parameters during the packet interval.

In yet another embodiment, more than two communications modes may be offered through the transmitter, wherein each mode provides a different data rate. Or, alternatively, the transmitter may be operable to switch to any number of different data rates when switching to the temporary communications mode, described above. In any event, when switching to a different data rate by changing the coding gain, the synchronization established for the present data rate may either be held frozen for the duration of the temporary mode, or a new synchronization may be established for the temporary mode, depending on the duration of the mode.

As illustrated in FIG. 1, communication system 10 can be any CDMA communication system, wherein wireless communications are established between a transmitting unit and a receiving unit. In one embodiment of such a CDMA communications system, once a low rate CDMA FDD channel is established between the transmitting and receiving units, the units continuously optimize dynamic power control and maintain despreading synchronization.

Figure 3:
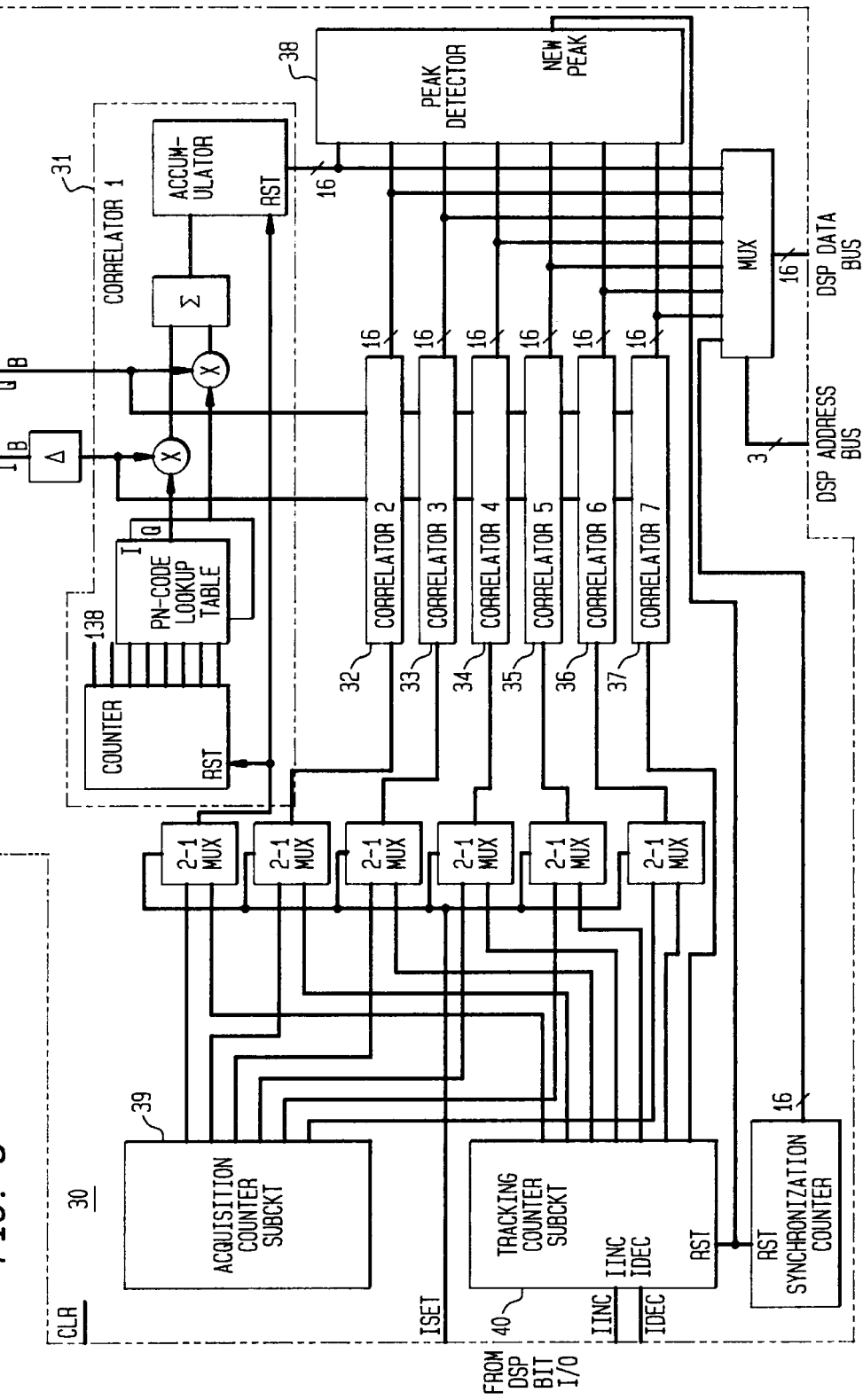
FIG. 3 shows a circuit block diagram of one embodiment of a RAKE circuit that can be used by a receiver in a wireless system according to the present invention.

In another embodiment, the receiver can be a RAKE receiver configured to acquire, track, and despread a spread spectrum packet data signal from the transmitting unit at any given data rate, and thus any given coding gain. Referring now to FIG. 3 there is shown a block diagram of one embodiment of a RAKE circuit utilized in a RAKE receiver to provide the multi-rate communications according to the present invention. As shown, RAKE circuit 30 has a correlator 31 coupled to a series of correlators 32–37. Correlators 31–37 are electrically coupled to peak detector 38, acquisition subcircuit 39 and tracking counter subcircuit 40.

In operation, RAKE circuit 30, which is controlled by a digital signal processor, provides the means for acquiring and tracking a signal transmitted on the wireless system of the present invention. That is, RAKE circuit 30 provides the controlling digital signal processor with the necessary information to combine multiple-received signals associated with multiple refection of the transmitted signal. Such multipath distortion is a phenomenon observed in wireless communications that occurs due to the multiple reflections of the transmitted signal arriving at the antenna of the receiver at different delays. In spread spectrum systems, these multiple images can be separated and realigned using what is known as a "RAKE", wherein the heart of the RAKE is the multiple correlator finger 31–37 shown in FIG. 3. Although seven fingers are shown, a RAKE receiver can be configured with any number of fingers without substantially changing the design or operation of the receiver.

Thus, although the present invention shows one embodiment of a RAKE receiver used in a receiver in a wireless system according to the present invention, the present invention is not hereby limited to the embodiment shown. Rather, the embodiment shown in FIG. 3 is only illustrative of the many different RAKE receivers that can be used in the wireless system of the present invention.

Consequently, the above description includes exemplary embodiments and methods of implementing the present invention. References to specific examples and embodiments in the description should not be construed to limit the present invention in any manner, and is merely provided for the purpose of describing the general principles of the present invention. It will be apparent to one of ordinary skill in the art that the present invention may be practiced through other embodiments.

What is claimed is:

1. A wireless packet data communication system, comprising:

a transmitter for spreading and transmitting said packet data at a given data rate, said transmitter operable to set a coding gain for said spread packet data transmission, wherein said coding gain determines said data rate;

a receiving element for receiving and despreading said spread packet data from said transmitter unit; and a channel for providing a physical link between said transmitter unit and said receiving element to communicate said spread packet data therebetween, said channel having a predetermined coherence interval;

said transmitter being operable to change and set said coding gain of said spread packet data transmission at any given time to thereby change said data rate to any given rate, and said receiving element operable to despread said spread packet data at any coding gain set by said transmitter.

2. The communications system of claim 1 wherein said transmitter is operable to establish a first coding gain during a normal mode of operation and a second coding gain during a temporary mode of operation, wherein said first coding gain sets a first data rate and said second coding gain sets a second data rate.

3. The communications system of claim 2 wherein said second data rate is greater than said first data rate.

4. The communications system of claim 3 wherein said transmitter is operable to transmit said packet data during said temporary mode of operation for a period of time less than said channel coherence interval.

5. The communications system of claim 4 wherein said transmitter sets said coding gain through a coding sequence having a given chip rate.

6. The communications system of claim 2 wherein said transmitter establishes said normal mode of operation through an initialization means comprising:

means for synchronizing communications between said transmitter and said receiving element to synchronize said coding sequence having said given chip rate therebetween, and means for determining a transmit power to establish a given bit error rate for said synchronized communications.

7. The communications system of claim 6 wherein said transmitter establishes said temporary mode of operation through an escape means comprising:

means for transmitting an escape instruction to inform said receiving element to switch to said temporary mode of operation; and means for determining a change in said transmit power to maintain said given bit error rate during said temporary mode of operation.

8. The communications system of claim 7 further comprising means for freezing said synchronization between said transmitter and said receiving element.

9. The communications system of claim 7 further comprising means for synchronizing communications between said transmitter and said receiving element for said temporary mode of operation.

10. The communications system of claim 7 wherein said escape instruction indicates a time duration for transmitting said packet data during said temporary mode of operation.

11. The communications system of claim 10 wherein said escape means further comprises means for transmitting a return instruction for instructing said receiving element to return to said normal mode of operation at a given time.

12. The communications system of claim 2 wherein said transmitter and said receiving element enter into said temporary mode of operation for a given duration of time.

13. The communications system of claim 12 wherein said given duration of time is less than said predetermined channel coherence interval.

14. The communications system of claim 6 wherein said means for determining said transmit power comprises:

means for monitoring said packet data at said receiving element to determine a measured power level, and a measured noise therefore;

means for calculating from said measured power level and said measured noise, a measured signal strength having a measured signal to noise (S/N) ratio;

means for monitoring said packet data at said receiving element to determine a measured bit error rate (BER) therefor;

means for adjusting said transmit power level when said measured BER is outside a tolerance range of said given BER.

15. The communications system of claim 14 wherein said means for adjusting said transmit power comprises:

means for calculating a measured BER when operating in said temporary mode of operation;

means for determining whether said measured BER is substantially the same as said given BER; and means for adjusting said transmit power so that said measured BER is substantially the same as said given BER.

16. The communications system of claim 1 wherein said channel is a multi-path channel.

17. The communication system of claim 1 wherein said receiver has a RAKE receiver for acquiring, tracking and despreading said packet data from said transmitter.

18. The communications system of claim 1 wherein said wireless system is a spread spectrum system employing code division multiple access (CDMA) coding.

19. A method for providing multi-rate packet data communications between a transmitter and a receiving element communicating over a channel on a wireless communications system, the channel having a given coherence interval, the method comprising the steps of:

establishing a first communication mode wherein the transmitter generates a signal having a coding gain for transmitting said packet data to the receiving element; and transmitting an escape instruction to the receiving element at any given time to instruct said receiving element to switch to a second communication mode, the transmitter being operable to generate a signal having a given coding gain during said second communication mode;

said coding gain of said first communication mode establishing a first data rate between said transmitter and said receiving element, and said given coding gain of said second communication mode establishing a second data rate between said transmitter and said receiving element;

said transmitter being operable to change and set said coding gain of said first and said second communication modes at any given time to thereby change said first and said second data rate at said any given time.

20. The method of claim 19 wherein said second data rate is greater than said first data rate.

21. The method of claim 20 wherein said transmitter is operable to transmit said packet data during said second communication mode for a period of time less than the channel coherence interval.

22. The method of claim 21 further comprising the step of setting said first and said second coding gain through a given coding sequence having a given chip rate.

23. The method of claim 22 wherein said step of establishing said first communications mode further comprises the steps of:

synchronizing communications between said transmitter and said receiving element to synchronize said coding sequence having said given chip rate therebetween, and establishing a transmit power to maintain a given bit error rate for said synchronized communications.

24. The method of claim 23 further comprising the step of establishing said second communication mode through an escape means, said escape means comprising the step of determining a change in said transmit power to maintain said given bit error rate during said second communication mode.

25. The method of claim 24 wherein said escape means further comprises the step of freezing said synchronization established during said first communication mode between said transmitter and said receiving element.

26. The method of claim 24 wherein said escape means further comprises the step of establishing a communications synchronization between said transmitter and said receiving element during said second communication mode.

27. The method of claim 19 wherein said escape instruction indicates a time duration for said temporary mode.

28. The method of claim 19 further comprising the step of transmitting a return instruction for instructing the receiving element to switch from said first communications mode to said second communications mode at a given time.

29. The method of claim 19 wherein said transmitter and said receiving element enter into said second communications mode for a given duration of time.

30. The method of claim 29 wherein said given duration of time is less than said predetermined channel coherence interval.

31. The method of claim 23 wherein said step of establishing said transmit power further comprises the steps of:

monitoring said packet data at said receiving element to determine a measured power level, and a measured noise therefore;

calculating from said measured power level and said measured noise, a measured signal strength having a measured signal to noise (S/N) ratio;

monitoring said packet data at said receiving element to determine a measured bit error rate (BER) therefor;

adjusting said transmit power level when said measured BER is outside a tolerance range of said given BER.

32. The method of claim 24 wherein said step of determining a change in said transmit power further comprises the steps of:

means for calculating a measured BER when operating in said second communications mode;

means for determining whether said measured BER is substantially the same as said given BER; and means for adjusting said transmit power so that said measured BER is substantially the same as said given BER.

33. The method of claim 19 wherein said channel is a multi-path channel.

34. The method of claim 19 wherein said receiver element has a RAKE receiver for acquiring, tracking and despreading said packet data from said transmitter.

35. The method of claim 34 wherein said RAKE receiver comprises:

an antenna operable to receive radio signals from said transmitting unit;

a demodulator coupled to said antenna for demodulating said radio signals;

a converter coupled to said demodulator for converting said demodulated radio signals to form a digital signal;

a RAKE circuit coupled to said converter for despreading and tracking said radio signals; and a digital signal processing unit coupled to said RAKE circuit for controlling said RAKE circuit so that the RAKE receiver is operable to provide said acquiring, tracking and despreading of said packet data for any given data rate.

36. The method of claim 19 wherein said wireless system is a spread spectrum system employing code division multiple access (CDMA) coding.

37. A method for providing high-rate packet data communications in a CDMA wireless system, comprising the steps of:

establishing a digital radio communication channel between a transmitting unit and a receiving unit for communicating a data packet signal at a first data rate therebetween, wherein said receiving unit has a RAKE receiver for despreading said data packet signal, said digital radio communication channel having a given coherence interval;

transmitting a pre-determined control data sequence to said receiving unit to instruct said receiving unit to receive said data packet signal at a second data rate, wherein said second data rate is greater than said first data rate;

transmitting said data packet signal at said second data rate to said receiving unit to said receiving unit during a predetermined time interval, wherein said predetermined time interval is less than said given coherence interval of said digital radio communication channel;

maintaining a constant power level during said transmitting of said data packet signal during the step of transmitting said data packet signal; and changing a coding gain of said digital radio communications synchronously with said transmitting unit, and extracting received data bits at said second data rate.

* * * * *